United States Patent [19]
Fitzpatrick et al.

[11] Patent Number: 5,757,735
[45] Date of Patent: May 26, 1998

[54] MAGENTO-OPTICAL RECORDING METHOD USING A MULTI-PULSE PATTERN GENERATION CIRCUIT

[75] Inventors: William B. Fitzpatrick, Woodland Park; John Deutschbein, Loveland, both of Colo.

[73] Assignee: Pinnacle Micro, Inc., Irvine, Calif.

[21] Appl. No.: 691,880

[22] Filed: Aug. 1, 1996

[51] Int. Cl.$^6$ ..................................... G11B 11/00
[52] U.S. Cl. ................... 369/13; 369/116; 369/59
[58] Field of Search ...................... 369/13, 14, 116, 369/110, 59, 54; 360/114, 59; 365/122

[56] References Cited

U.S. PATENT DOCUMENTS

| | | | |
|---|---|---|---|
| 5,170,382 | 12/1992 | Yamada et al. | 369/13 |
| 5,200,935 | 4/1993 | Watanabe et al. | 369/13 |
| 5,365,501 | 11/1994 | Fuji et al. | 369/13 |
| 5,450,381 | 9/1995 | Tsukamura et al. | 369/13 |

*Primary Examiner*—Tan Dinh
*Attorney, Agent, or Firm*—Steven G. Sereboff; Sereboff & Buyan

[57] ABSTRACT

In a magneto-optical recording method and, more particularly, a bit position recording method, laser beam intensity is pulse-modulated between high and low levels according to data to be recorded. The modulated laser beam is radiated on a recording medium under the presence of a bias field. High-level emission time of the laser beam is shortened at the inner portion of the medium, and is prolonged at the outer portion. Low-level intensity of the laser beam is decreased at the inner portion of the medium, and is increased at the outer portion, thereby increasing C/N ratio upon reproduction.

32 Claims, 6 Drawing Sheets

Figure 2A
(Prior Art)
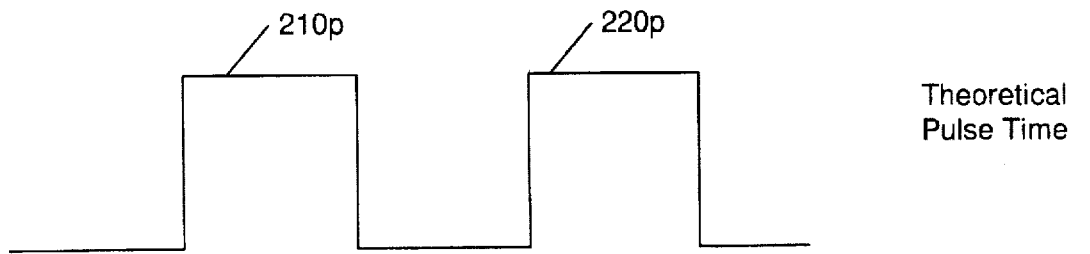
Theoretical
Pulse Time
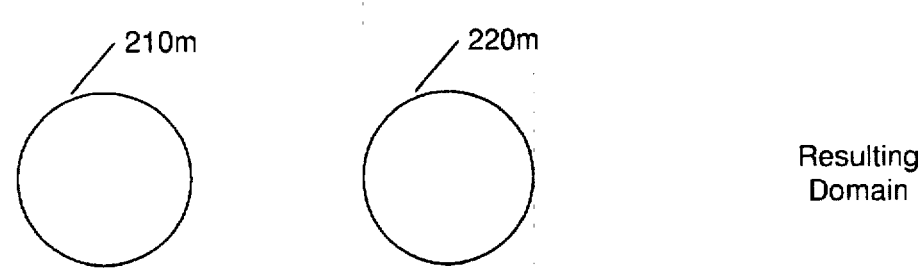
Resulting
Domain
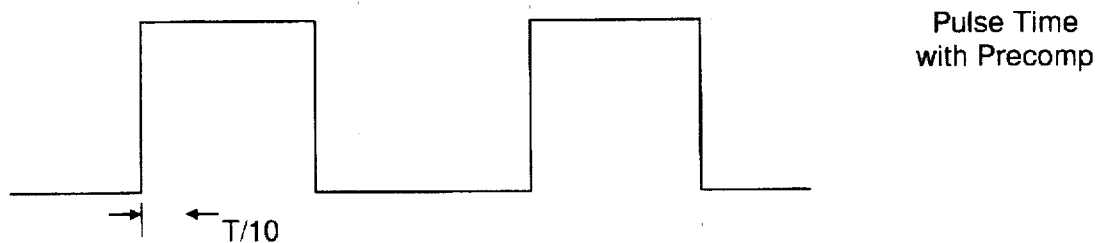
Pulse Time
with Precomp
Figure 2B
(Prior Art)

Hot 4T MPP
(no precomp)

Cool 4T MPP
(with precomp)

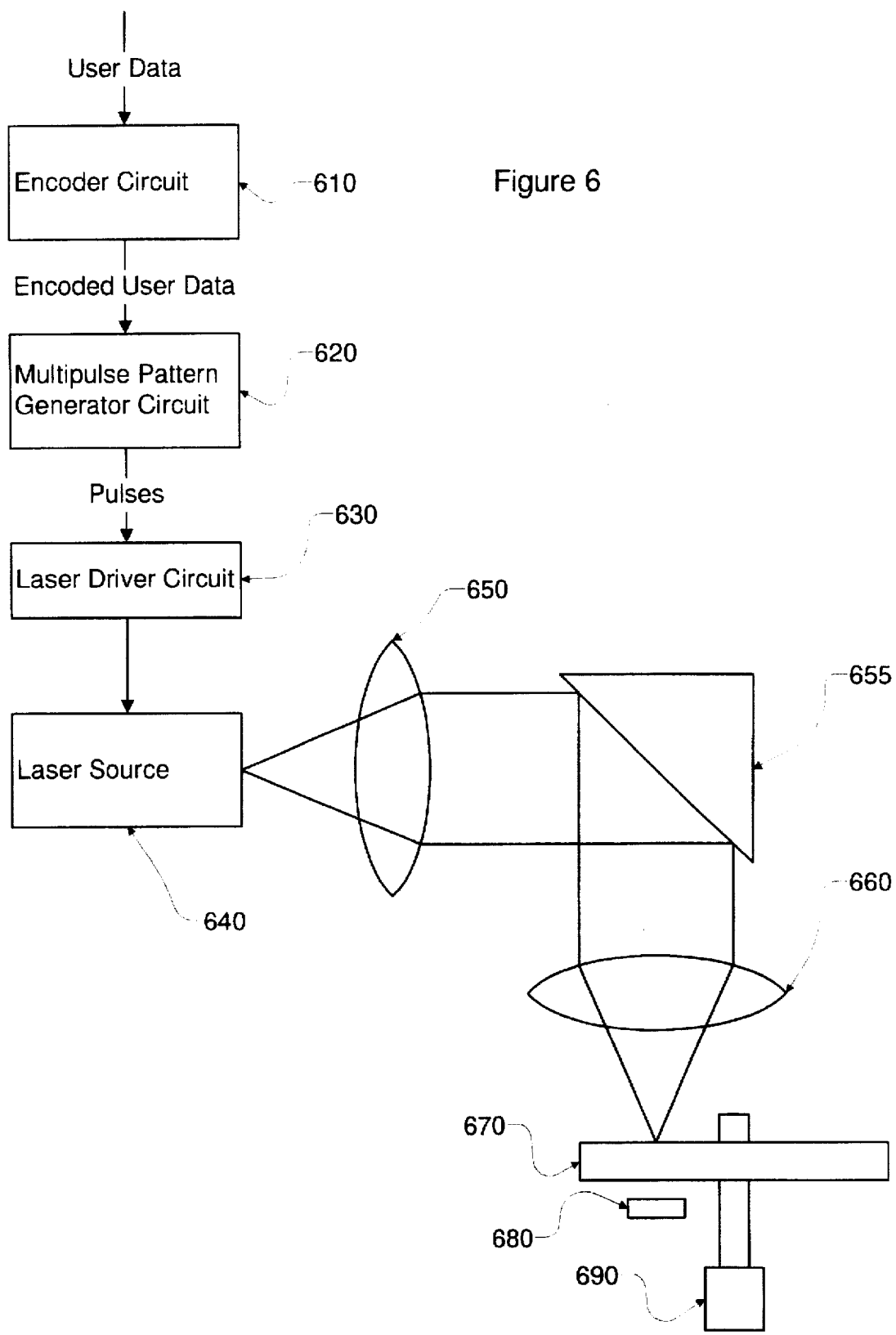

MAGENTO-OPTICAL RECORDING METHOD USING A MULTI-PULSE PATTERN GENERATION CIRCUIT

BACKGROUND OF THE INVENTION

1. Field of the Invention

The present invention relates generally to magneto-optical (MO) data storage systems, and particularly to methods of writing data on MO media.

2. Description of Related Art

Magneto-optical (MO) data storage systems have been known for some time. MO systems provide a number of advantages over other data storage systems. A significant feature of MO systems is that information can be erased from the MO medium after use and new information can be repetitively written on and read from the MO medium. Desirable qualities of an MO system include: high density, large capacity, high access speed, high writing speed and high reading speed. These qualities are achieved through careful design of the MO medium, the methods of writing and reading from the medium, and the device used for writing and reading.

An MO medium is typically a multi-layer disk. An MO medium has a perpendicular magnetic anisotropy layer or layers as a recording layer. This magnetic layer comprises, for example, amorphous GdFe, GdCo, GdFeCo, TbFe, ThCo, TbFeCo, and the like. Concentric or spiral tracks are normally formed on the recording layer, and data is recorded on the tracks.

An MO disk typically includes a groove for tracking. The portion between adjacent grooves is called a land. A perpendicular magnetic film is formed on both the grooves and lands. For this reason, a groove portion may be used as a track, and a land portion may be used as a track. There is no special relationship between the widths of the groove and land.

One way to achieve higher data densities has been to use run length limited (RLL) encoding before writing user data. In RLL encoding, the maximum number of 0s and minimum number of zeros between 1s is fixed. For example, in a 1, 7 RLL encoding scheme, there is at least one 0 and as many as seven 0s between 1s. Binary user data which is to be written to the MO disk is first RLL encoded, resulting in "modulation data" (a stream of "modulation bits"). The encoding process typically involves a look-up table with a limited number of code words. One of the benefits of RLL encoding is that it ensures proper phase lock loop (clock) tracking.

The MO media are typically recorded and played on an optical drive. Optical drives are similar to CD-ROM drives. Optical drives are also similar to hard disk drives. Some optical drives can record MO disks as well as read MO disks and other optical disks. These other optical disk formats include audio CD, CD-ROM, ablative WORM and phase change WORM.

An optical drive mainly comprises a rotation means for the MO disk, a laser for emitting a laser beam, optics for guiding and focusing the laser beam onto an MO disk, a modulation means for modulating the laser beam in accordance with information to be recorded, and in the case of MO drives, a magnetic field source for applying a recording magnetic bias field.

Typical MO media store data in "domains." A domains is either a "mark" or a "space." A space is a discrete area of a MO medium, typically located on a single track, having a magnetic alignment of a first direction. Typically, when a sector of an MO medium is to be written, it is first initialized to all spaces. This is known as an erase pass. A mark is a discrete area of a MO medium, typically located on a single track, have a magnetic alignment measurably different from that of a space. This measurable difference is the means for reading data from the MO media.

To write a mark, the laser is used to generate heat on a target spot of the MO disk so that the spot reaches the Curie point. Theoretically, during recording, the laser need only be turned on and off. Thus, one pulse of the laser beam could form one mark. To create a mark, however, requires careful selection of MO disk materials, laser beam frequency, laser beam duration, laser beam width, laser beam intensity, and MO disk rotation speed.

Since an MO medium is initialized with spaces, theoretically spaces are not "written." However, in practice, spaces are said to be written. Writing a space, though, generally simply involves allowing the MO disk to turn a predefined amount without firing the laser.

Most MO systems utilize constant angular velocity (CAV) recording techniques. In CAV, the rate at which the MO disk spins is constant, no matter where on the MO disk the optical drive may be writing. Another technique, known as constant linear velocity (CLV), has the MO disk spinning at different speeds depending on where data is being written. CAV, for a number of reasons, is more popular than CLV.

One result of using CAV is that the linear velocity is greater at the outside of an optical disk than at the inside of the optical disk. To keep domain lengths constant, the write time is longest (lowest frequency) at the inside track (or zone) of the optical disk and shortest (highest frequency) at the outside of the optical disk. It is preferred to make domains their minimum size to increase density.

Another feature of data written to an MO disk is that the RLL encoded data is also converted using the "non return to zero" (NRZ) scheme. According to the NRZ scheme, modulation bits themselves are not written as domains. Rather, if the MO drive was writing a particular type of domain (mark or space) when a 0 modulation bit is to be recorded, then the same type of domain continues to be written. However, a 1 modulation bit signals a transition between domain types. Thus, if the MO drive was writing a mark when a 1 modulation bit is to be written, the MO drive starts writing a space. Likewise, if the MO drive was writing a space when a 1 modulation bit is to be recorded, the MO drive starts writing a mark. These transitions typically are made in the middle of a clock cycle. It can be seen that a domain can have quite a large length, although in practice, because user data is RLL encoded, domain lengths are limited.

A "T" is an increment in time between different domain lengths. To accommodate CAV, T is varied to maintain optimum (i.e., minimum) domain length, regardless of the track. In 1, 7 RLL encoding, domains can be any of seven lengths: 2T, 3T, 4T, 5T, 6T, 7T or 8T.

Writing marks using a simple on-off method results in several problems. In thermal blooming, the mark is bigger (e.g., wider and longer) than desired. Blooming results from too much heat being applied to the MO disk during writing. In another problem, misplacement, the mark, although properly formed, is somewhat out of position from that desired. Misplacement occurs because (i) the laser is fired too soon, (ii) the MO disk is rotating too fast, or (iii) the laser beam does not heat up the target spot quickly enough. In general, lasers cannot be fired quickly enough and with sufficient power to overcome these problems and still achieve sufficient data density.

Thus, more practically, laser beam intensity is varied between a high level to write a mark a low level to write a space. Yet, even this two level approach has not been satisfactory.

Another method of writing data on MO media is known as the "four level method." Referring now to FIG. 1A, the four level method is described. In accordance with the four level method, a mark is written, not by a single pulse, but by a sequence of pulses at various power levels. When a mark is to be written, a laser beam is first pulsed at a low intensity $I_{PH}$. The low intensity $I_{PH}$ is a preheating level, which preheats the target spot to a desired temperature below the Curie point. Typically, $I_{PH}$ will be for a time T/2. A pulse of $I_{PH}$ for T/2 may also correspond to the power level for reading.

Next, the laser beam intensity is increased to $I_1$. Laser beam intensity remains at $I_1$ for 3/2 T. Thus, a 2T mark is written. Pulsing the laser beam to $I_1$ for 3/2T generates the desired temperature without overextending the laser.

If the mark is to be only 2T, then writing is complete. However, if the mark is to be longer, then additional pulses are generated. After the pulse to $I_1$ the laser beam power is dropped back to $I_{PH}$ for T/2. Then, the laser beam intensity is raised to $I_2$. $I_2$ is greater than $I_1$. However, this intensity $I_2$ is held for only T/2. This results in the mark being an additional T in length. FIG. 1A shows a series of four pulses from $I_{PH}$ to $I_2$, resulting in a 5T mark.

After the mark has been written, the laser beam intensity drops to a very low quenching level $I_Q$. $I_Q$ may be, for example, 0. At $I_Q$, no writing takes place. After some period of time during which a space is written, a mark might again be written, with the laser beam power being first raised to $I_{PH}$ as before.

In theory, the four level method works quite well. However, implementation of the four level method has not been as successful as desired. The primary problem resides in the optical drive's ability to change the laser beam's power level. The power level of the laser beam is controlled by either or both of changing the intensity or length of a pulse. Yet, neither of these techniques is perfect, and the clean pulses of FIG. 1A actually are generated as irregular pulses such as shown, for example, in FIG. 1B. These irregularities are known as ringing. To overcome ringing, the optical drive's output circuits must be under damped.

Ringing is in part due to the laser's rise time. Referring now to FIG. 1C, it can be seen that the laser's rise time is the time $t_r$ for the laser to reach the desired intensity I. Once at I, the laser output is kept constant for a plateau time $t_p$. Finally, there is a fall time $t_f$ in which the laser power drops back down. The rise time $t_r$ and fall time $t_f$ are typically on the order of the plateau time $t_p$.

Implementation of the four level method requires calibration and switching between four laser beam intensities. This is typically implemented using four digital to analog converters (DACs) for the laser. Also, T/2 pulses are difficult to generate at high MO disk rotation speeds. This is in part due to the minimum rise time and fall time for the laser and the speed of the modulating means.

Another factor affecting quality of writing a mark is whether the preceding domain was a mark or a space. Domains are written very close together to achieve high densities (and thus high media capacity). For example, as shown in FIG. 2A, a first theoretical pulse 210 p results in a corresponding first mark 210 m. A second theoretical pulse 220 p results in a corresponding second mark 220 m.

Yet, after a mark is written, there is some delay before the heat energy applied to the domain subsides. If a second mark is to be written after a short space was written, then the residual heat from the first mark can affect the quality of the second mark.

To adjust for the absence of residual heat, as shown in FIG. 2B, writing is started a bit earlier. In a literal sense, starting a mark early is known as "precomp." However, in the MO art, precomp may refer to starting a mark early or late. A precomped mark has the same length as a non-precomped mark. The precomp is typically on the order of T/10, and might also be, for example, T/20. In practice, the precomp depends on the prior RLL pattern written and may be negative or positive. A precomp table is used which, depending on the RLL pattern to be written (e.g., 2T, 3T, 4T . . . 8T) and the prior pattern, provides the proper precomp.

As in the four level method, precomping has its own set of problems. First, precomp requires a very high precision edge delay or advance. As mentioned, this delay or advance can be on the order of T/20 to T/10, which in practice is very fast. Second, the precomp table must be experimentally determined. The precomp will vary with the radius of the laser beam, with the thin film structure of the MO medium, and other factors. Because the radius of the laser beam can vary, types of MO media vary, and quality of a given type of MO medium vary, the precomp table can be quite difficult to produce and its reliability is limited.

It is therefore a first object of the invention to provide a method of writing on MO media which reconciles for a prior mark being written. It is a further object to provide a method of writing on MO media obviating the need for precise calibration and high speed switching of a laser beam. It is a further object to provide an MO system having performance and throughput comparable to that of a standard hard disk drive. It is a further object to provide an MO system having a lower cost-per-megabyte than magnetic hard drives. It is a further object to provide an MO system having improved reliability over typical MO systems. It is a further object to provide an MO system with wide ranging abilities. These objects and others are provided by the of the present invention.

SUMMARY OF THE INVENTION

In accordance with the present invention, there is provided a method a writing data using an MO drive which is efficient and reliable. In accordance with one aspect of the invention, laser control codes for controlling the firing of a laser are obtained from plural multipulse pattern tables. The multipulse patterns represent the laser pulses to be used to write a desired mark. For a given mark to be written, the appropriate multipulse pattern table is selected based upon whether precomp is needed, and the particular entry in the multipulse pattern table is selected based upon the desired mark length.

The multipulse patterns tables may be changed depending on the MO media or other media to be written using the MO drive. Also, several multipulse tables may be provided for a given media to accommodate varying degrees of precomp.

In accordance with a second aspect of the invention, the laser control codes are for controlling the laser to emit pulse trains. The pulses are of equal power and duration, and a pulse train may include periods without pulses.

DESCRIPTION OF THE DRAWINGS

These and other advantages of the present invention are best understood with reference to the drawings, in which, in varying detail:

FIG. 2A is a graph of a theoretical pulse train and the theoretical resulting domains.

FIG. 2B is a graph of a pulse train having precomp to write the domains of FIG. 2A.

FIG. 6 is a block diagram of a MO drive and MO medium.

Figure 1A:
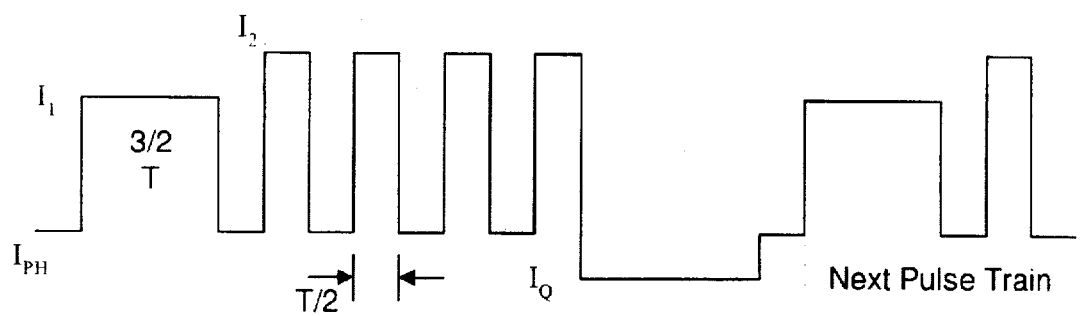
FIG. 1A is a theoretical graph of power versus time of a 5T mark being written using the four level method.
Figure 1B:
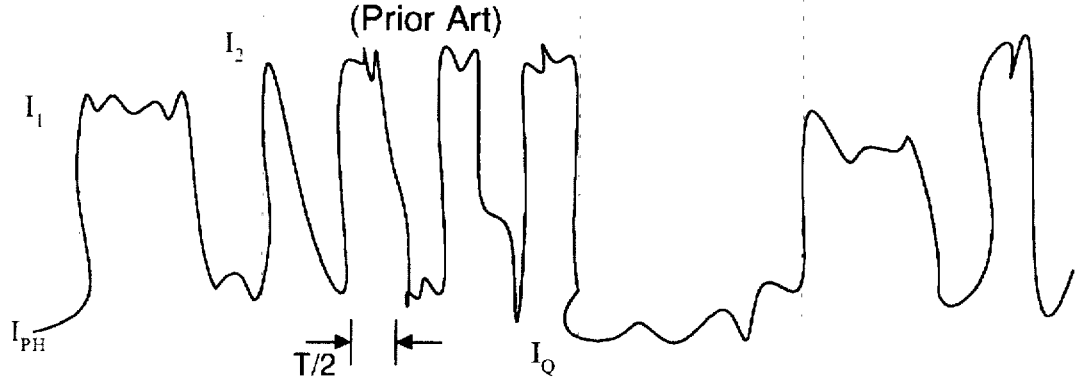
FIG. 1B is a graph approximating the actual power versus time behavior of the 5T mark of FIG. 1A being written using the four level method.
Figure 1C:
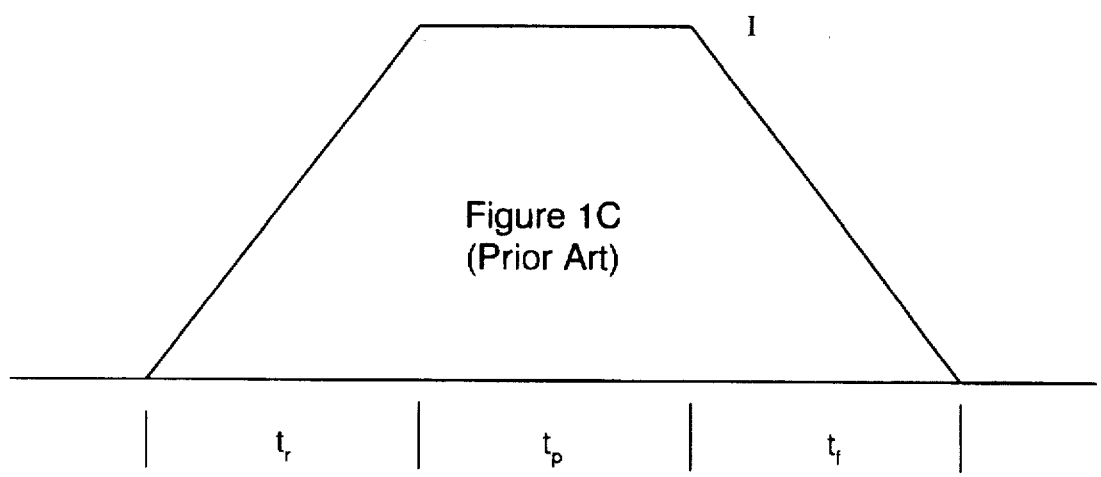
FIG. 1C is a graph of a laser pulse power versus time showing the rise time and fall time in addition to the plateau time.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

Referring now to FIG. 6, there is shown a block diagram of an MO drive and a MO medium 670 according to an embodiment of the present invention. The MO medium 670 is preferably an MO disk having plural tracks and is supported by a rotation means 690. The rotation means 690 preferably includes a motor for spinning the MO medium 670. In a CAV system as is preferred, the rotation means 690 rotates the MO medium 670 such that the tracks on the MO medium 670 rotate at a predefined relatively constant rate.

To write a domain from user data, several steps are necessary. The user data comprises a stream of binary bits, 1s and 0s. In a first step, the user data is encoded by the encoder circuit 610. Preferably, this encoding comprises RLL encoding such that the encoder circuit 610 outputs a stream of modulation bits. However, other forms of encoding are within the scope of the invention.

Next, the modulation bits are fed to a multipulse generator circuit 620. Preferably, the multipulse generator circuit 620 is implemented as an ASIC. The multipulse generator circuit 620 analyzes the stream of modulation bits and generates laser control codes to the laser drive 630 for writing domains. The laser drive circuit 630 uses the laser control codes to pulse-modulate the laser source 640 such that pulsed laser beams of varying length are emitted.

In accordance with the invention, the laser pulses have a fixed intensity and variable length. A laser pulse may be, for example, from a lower intensity $I_L$ to a higher intensity $I_H$, then back to $I_L$. The MO drive preferably also uses the intensity $I_L$ for reading from the MO medium. The length of the laser pulse is determined by the laser control code, and a single laser control code may signal multiple laser pulses.

The laser pulses are not delayed or advanced for precomp as in the prior art. Rather, the pulses begin and end at fixed intervals, preferably intervals of T/2. For precomp, the timing and/or length of pulses in a pulse train as signaled by a laser control code are adjusted.

Writing with a single form of pulse provides a number of benefits. First, the laser driver circuit 630 is quite simple. This reduces the MO drive's costs. Second, precise calibration of numerous pulses forms is not needed. Third, the laser beam need not be switched at an especially high and difficult-to-achieve speed. Fourth, reliability is improved over typical MO systems.

The laser beams from the laser source 640 are collimated by a collimator lens 650, reflected by a beam splitter 655, and focused by an objective lens 660 onto the MO medium 670. Preferably, the MO drive includes additional focusing and tracking servo devices (not shown).

A mark is written when the MO medium 670 is heated to a sufficient temperature and an appropriate magnetic field is applied. The recording magnetic field may be from a permanent magnet 640 or other magnetic field generating means.

Together, the following element can be said to be a writing means: the laser driver circuit 630, the laser source 640, the collimator lens 650, the beam splitter 655, the objective lens 660, the rotation means 690 and the magnet 640. The writing means is an apparatus which receives primitive signals such as the laser control codes and records them onto a medium.

Figure 3:
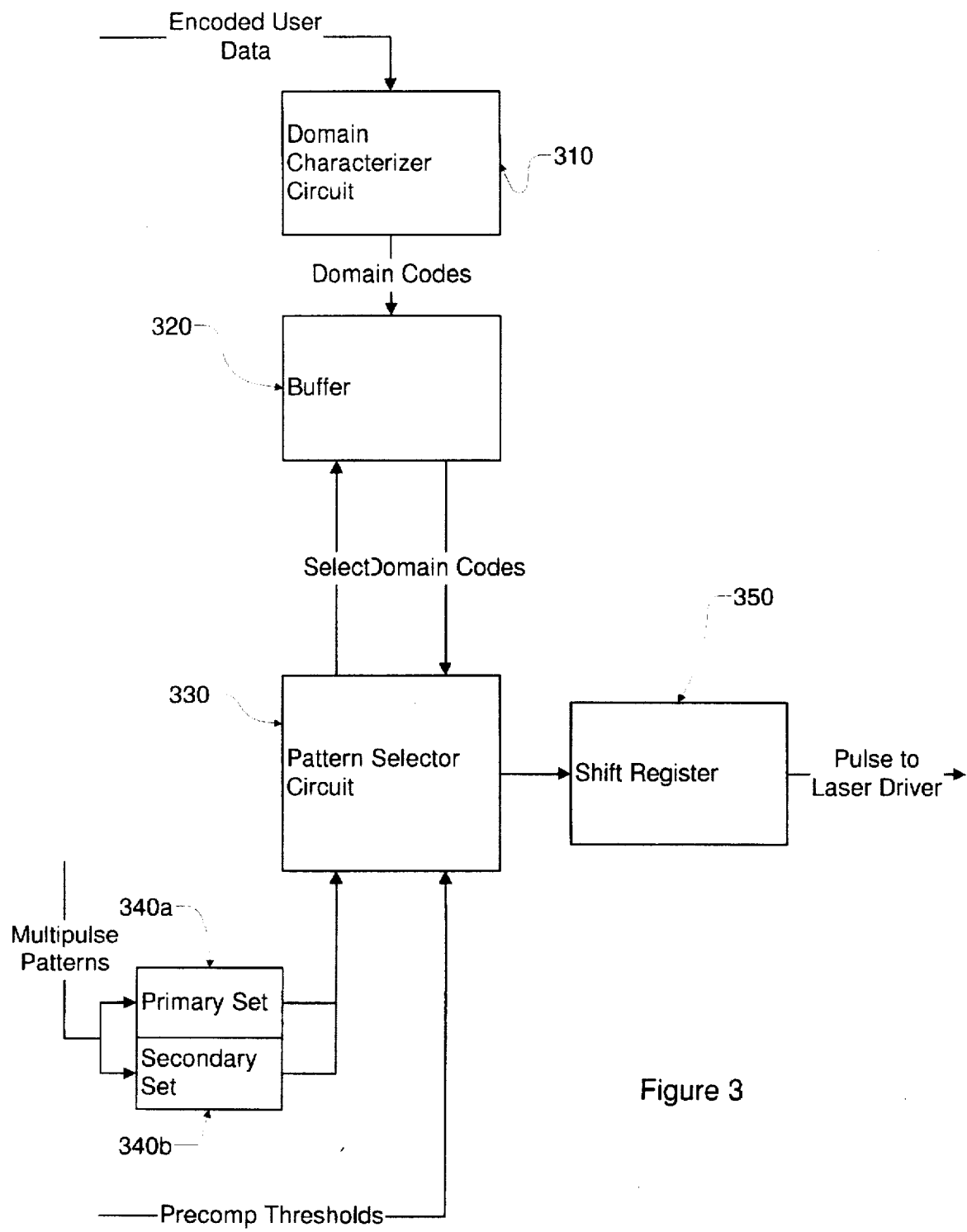
FIG. 3 is a block diagram of a multipulse pattern generator in accordance with the invention.

Referring now to FIG. 3, there is shown a block diagram of the multipulse generator circuit 620 of FIG. 6. The stream of modulation bits, when first entering the multipulse generator circuit 620 is fed into a domain characterizer circuit 310. The domain characterizer circuit 310 characterizes the stream of modulation bits as a stream of "domain codes."

A domain code comprises a domain type and a domain length. The domain type is either "mark" or "space." In the preferred embodiment, the user data has been encoded by the encoder circuit 610 using 1, 7 RLL encoding. Thus, the domains length may be 2T, 3T, 4T, 5T, 6T, 7T or 8T.

The domain characterizer circuit 310 is preferably an NRZ converter. Domains therefore alternate between marks and spaces. A 1 modulation bit signals an end to one domain and a start of the next domain. The length of a domain is equal to one plus the number of 0s between a starting 1 modulation bit and an ending 1 modulation bit.

The domain characterizer 310 may comprise, for example, a flip-flop to indicate the current domain type and a counter to count the domain length. In such an embodiment, each time the domain characterizer 310 receives a 1 modulation bit, the flip-flop changes state and the counter resets. Alternatively, the domain characterizer 310 could comprise separate units for characterizing marks and spaces. As another alternative, the domain characterizer 310 could include a PLD or other look-up table which stores codes corresponding to permitted domain codes.

The buffer 320 preferably stores a number of domain codes. As will be more apparent below, the buffer 320 should be able to store at least three domain codes. The domain codes stored in the buffer 320 may each be read. In the preferred embodiment, the buffer 320 is a circular queue having space for eight domain codes (four marks and four spaces).

After a domain code has been stored in the buffer 320, a pattern selector circuit 330 converts the domain code into a laser control code. The pattern selector circuit 330 then shifts the laser control code into shift register 350. The shift register 350 shifts the laser control code out, one bit at a time to the laser driver circuit (630, FIG. 6). Preferably, the clock rate is T/2.

In the preferred embodiment, the laser driver circuit 630 operates according to a clock rate of T/2 pulse to create laser beam pulses having lengths of multiples of T/2. A 1 bit of the laser control code signals the laser driver circuit 630 to pulse the laser source 640. A 0 bit of the laser control code signals the laser driver circuit 630 not to pulse the laser source 640. Thus, for example, a laser control code for a 2T mark is four bits long, and a laser control code for a 5T mark is 10 bits long. However, to write the 2T mark, it might only be necessary to pulse the laser source 640 for 3/2 T, or even 1T. Preferably, the laser driver circuit 630 pulses the laser source 640 so that contiguous 1s of a laser control code result in a single, continuous laser beam pulse.

Of course, selection of the meaning of 1 and 0 is arbitrary and could be reversed. Also, the invention is not strictly limited to pulses and non-pulses, although, as explained above, this provides a number of benefits. Furthermore, although a 0 bit of the laser control code is described herein as meaning "do not pulse," the laser source 640 could emit a laser beam of a sufficiently low intensity $I_L$ that the laser beam does not deliver significant heat energy.

Preferably during initialization of the MO drive, at least two multipulse pattern (MPP) sets are loaded into the multipulse generator circuit 610. An MPP set comprises a list of laser control codes for each of the possible lengths of marks. Preferably, to write a mark of a given length, each MPP has a laser control code of the same length (number of bits).

In the preferred embodiment, a first MPP set 340a is for writing marks without precomp and a second MPP set 340b is for writing marks with precomp. Table 1, below, is an example of a primary MPP set. Table 2, below, is an example of a secondary MPP set. In Tables 1 and 2, a laser control code may be up to 16 bits, with each bit signaling a pulse or non-pulse of T/2. As can be seen, for marks of length greater than 3T, the corresponding laser control codes in Tables 1 and 2 are different. This is the case because for shorter marks such as the 2T and 3T marks of the preferred embodiment, precomp is not necessary.

One other feature of the MPP sets of Table 1 and Table 2 are that for each mark length, the corresponding laser control codes have an equal number of 1s and 0s. Although this may not necessarily be the case, it demonstrates one aspect of the invention. That is, to precomp, the intensity and length of the laser pulses to write a mark are not adjusted. Rather, the time when the pulses are issued is adjusted, and this adjustment occurs for the same increment of time in which the laser pulses are measured out.

Also preferably during initialization of the MO drive, at least two thresholds are loaded into the multipulse generator circuit 610. The thresholds are used by the pattern selector circuit 330 to select which MPP set to use. In the preferred embodiment, the thresholds define a situation when there is residual heat and precomp is needed. Accordingly, the first threshold is the maximum length for the last-written space, and the second threshold is the minium length for the last-written mark, for which there will be residual heat.

It is within the scope of the invention to include more than two MPP sets and more than one pair of thresholds. For example, there could be a "cold" MPP set, a "cool" MPP set, a "warm" MPP set and a "hot" MPP set, with four pairs of precomp thresholds. An embodiment of the invention could also provide more than one threshold pair which point to the same MPP set. To accommodate different types of MO media, the MO drive preferably loads MPP sets and thresholds appropriate to the MO medium to be written on.

TABLE 1

Primary Set of MPPs for no Precomp

| Length | 0 | .5 | 1 | 1.5 | 2 | 2.5 | 3 | 3.5 | 4 | 4.5 | 5 | 5.5 | 6 | 6.5 | 7 | 7.5 |
|---|---|---|---|---|---|---|---|---|---|---|---|---|---|---|---|---|
| 2T | 0 | 1 | 1 | 1 | | | | | | | | | | | | |
| 3T | 0 | 1 | 1 | 0 | 1 | 1 | | | | | | | | | | |
| 4T | 0 | 1 | 1 | 1 | 0 | 0 | 1 | 1 | | | | | | | | |
| 5T | 0 | 1 | 1 | 1 | 1 | 1 | 0 | 0 | 1 | 1 | | | | | | |
| 6T | 0 | 1 | 1 | 1 | 0 | 0 | 1 | 1 | 0 | 0 | 1 | 1 | | | | |
| 7T | 0 | 1 | 1 | 1 | 1 | 1 | 0 | 0 | 1 | 1 | 0 | 0 | 1 | 1 | | |
| 8T | 0 | 1 | 1 | 1 | 0 | 0 | 1 | 1 | 0 | 0 | 1 | 1 | 0 | 0 | 1 | 1 |

TABLE 2

Secondary Set of MPPs for Precomp

| Length | 0 | .5 | 1 | 1.5 | 2 | 2.5 | 3 | 3.5 | 4 | 4.5 | 5 | 5.5 | 6 | 6.5 | 7 | 7.5 |
|---|---|---|---|---|---|---|---|---|---|---|---|---|---|---|---|---|
| 2T | 0 | 1 | 1 | 1 | | | | | | | | | | | | |
| 3T | 0 | 1 | 1 | 0 | 1 | | | | | | | | | | | |
| 4T | 0 | 1 | 1 | 0 | 0 | 1 | 1 | 1 | | | | | | | | |
| 5T | 0 | 1 | 1 | 1 | 1 | 1 | 0 | 1 | 1 | 1 | | | | | | |
| 6T | 0 | 1 | 1 | 0 | 0 | 1 | 1 | 0 | 0 | 1 | 1 | 1 | | | | |
| 7T | 0 | 1 | 1 | 1 | 1 | 0 | 0 | 1 | 1 | 0 | 0 | 1 | 1 | 1 | | |

TABLE 2-continued

| | Secondary Set of MPPs for Precomp | | | | | | | | | | | | | | | |
|---|---|---|---|---|---|---|---|---|---|---|---|---|---|---|---|---|
| | Time | | | | | | | | | | | | | | | |
| Length | 0 | .5 | 1 | 1.5 | 2 | 2.5 | 3 | 3.5 | 4 | 4.5 | 5 | 5.5 | 6 | 6.5 | 7 | 7.5 |
| 8T | 0 | 1 | 1 | 0 | 0 | 1 | 1 | 0 | 0 | 1 | 1 | 0 | 0 | 1 | 1 | 1 |

Continuing again with the passage of a domain code from the buffer 320 to the pattern selector circuit, the pattern selector circuit 320 first examines the domain code's domain type and selects a laser control code to shift to the shift register 350. The pattern selector circuit handles spaces and marks differently.

If the domain type is "space," then pattern selector circuit 330 simply produces a laser control code of a number of 0s corresponding to the domain length. In the preferred embodiment, because each bit of the laser control code is T/2 long, the laser control code for a space is double the domain length.

If the domain type is "mark," then the pattern selector circuit 330 performs a several other steps to produce a laser control code. The first step is to select one of the MPP sets 340a, 340b.

In the disclosed embodiment, the selection of an MPP set is based upon whether precomp is needed. As explained above, precomp is needed if there is residual heat from a long mark followed by a short space. Therefore, the pattern selector circuit 330 needs to know the domain length of the last mark and the domain length of the last space—information which is stored in the buffer. In particular, the pattern selector circuit retrieves the domain length of the last mark and the domain length of the last space and stores them, in the preferred embodiment, in registers.

Figure 5:
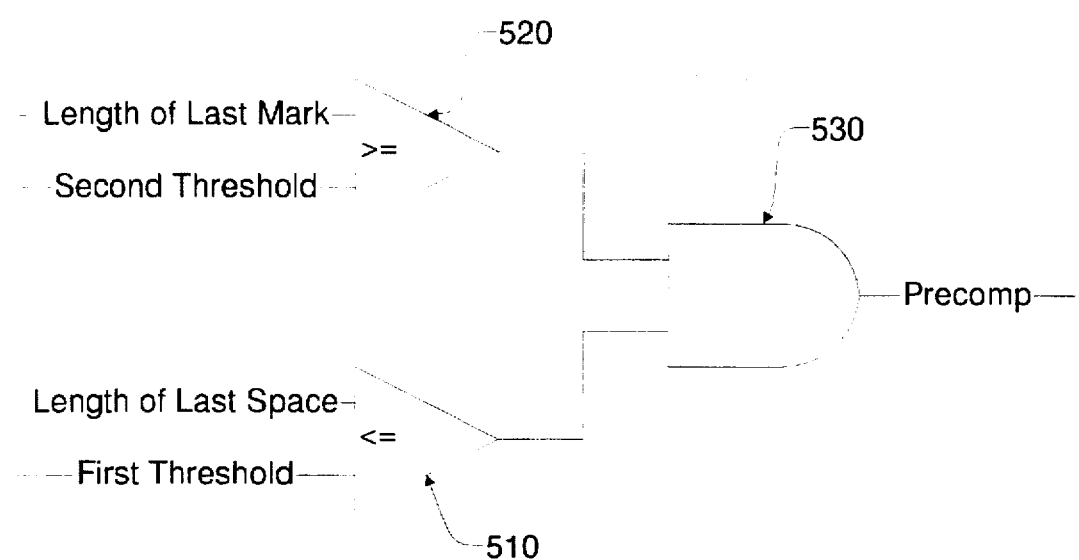
FIG. 5 is a logic diagram for the precomp-decision process in accordance with the invention.

Referring now to FIG. 5, there is shown a logic diagram for the MP set decision process. The logic of FIG. 5 resides in the pattern selector circuit 330 (FIG. 3). Comparator 510 compares the domain length of the last written space with the first threshold, and if the last written space's domain length was less than or equal to the first threshold, then comparator 510 outputs "true." Comparator 520 compares the domain length of the last written mark with the second threshold, and if the last written mark's domain length was greater than or equal to the second threshold, then comparator 520 outputs "true." If both comparators output true, meaning in the preferred embodiment that there is residual heat, then gate 530 also outputs "true" and the pattern selector circuit 330 knows to utilize the secondary MPP set.

After the pattern selector circuit 330 has selected an MPP set, the pattern selector circuit 330 uses the domain length from the current domain code to select the appropriate laser control code from the selected MPP set.

EXAMPLE

To further demonstrate the method of the invention, the process for writing a small sample of user data is now described. Suppose that a user data stream has been encoded to the following stream of modulation bits: 1000001010001 (the most significant bit is on the left). In this example, Table 1 is the primary MPP set, Table 2 is the secondary MPP set, the first threshold is 2 and the second threshold is 4.

As the domain characterizer circuit 310 receives the stream of modulation bits, the first 1 in the stream signals a transition. As mentioned above, when a sector of an MO medium is to be written, it is first initialized to all spaces. Thus, this first 1 modulation bit signaled a transition to a mark. After five 0 modulation bits, a 1 modulation bit is received. Thus, this will be a 6T mark, and the domain characterizer circuit 310 puts into the buffer 320 a first domain code having domain type="mark" and a domain length of 6T.

Next, the pattern selector circuit 330 retrieves the first domain code and, recognizing it as a mark, retrieves from the buffer 320 the last two domain codes. Since the sector was initialized to spaces, there is no residual heat and the primary MPP set is selected. This may be shown with reference to the logic of FIG. 5. The last space had a length of 8T (the longest possible space, per the 1, 7 RLL code) and the first threshold is 2T. Therefore, comparator 510 outputs false. With a false output from comparator 510, the output of comparator 520 is not important, since and gate 530 must also output false, and precomp is not needed and the pattern selector circuit 330 selects the primary MPP set as shown in Table 1.

The pattern selector circuit 330 then obtains the laser control code from Table 1 for a 6T mark, which is 011100110011. This laser control code is transmitted to shift register 350 which generates a signal every T/2 for each bit of the laser control code.

While the pattern selector circuit 330 is selecting the laser control code for the first domain code, the domain characterizer circuit 310 is creating a second domain code. This second domain code has a domain type="space" (because the first domain code had a domain type="mark"). Although domain types are being referred to herein as "mark" and "space," these names are merely representations which are equivalent to signals which are recognized as identifying a domain code as being for a mark or a space.

The 1 modulation bit which signaled the end of the first domain code also signaled the beginning of the second domain code. After that 1 modulation bit, there is just one 0 modulation bit before the next 1 modulation bit. Hence, the second domain code has a domain length of 2T. The domain characterizer circuit 310 then stores the second domain code in the buffer 320.

After the pattern selector circuit 330 has finished with the first domain code, it retrieves the second domain code. Recognizing the second domain code as a space, the pattern selector circuit 330 transmits a laser control code for a 2T space—0000—to the shift register 350.

While the pattern selector circuit 330 is selecting the laser control code for the second domain code, the domain characterizer circuit 310 is creating a third domain code. This third domain code has a domain type="mark" (because the second domain code had a domain type="space"). The 1 modulation bit which signaled the end of the second domain code also signaled the beginning of the third domain code. After that 1 modulation bit, there are three 0 modulation bits before the next 1 modulation bit. Hence, the third domain code has a domain length of 4T. The domain characterizer circuit 310 then stores the third domain code in the buffer 320.

The pattern selector circuit 330 retrieves the third domain code and, knowing it to be a mark, reprieves from the buffer 320 the prior two domain codes 320. The last domain code (i.e., the second domain code of this example) was a 2T space, and the next to last domain code (i.e., the first domain code of this example) was a 6T mark. Therefore, comparator 510 outputs true, and comparator 520 also outputs true. Hence, the comparator logic causes selection of the secondary MPP set as shown in Table 2.

The pattern selector circuit 330 then obtains the laser control code from Table 2 for a 4T mark, which is 01100111. This laser control code is transmitted to shift register 350. The laser beams are pulsed to write the 4T as shown in FIG. 4B.

Figure 4A:
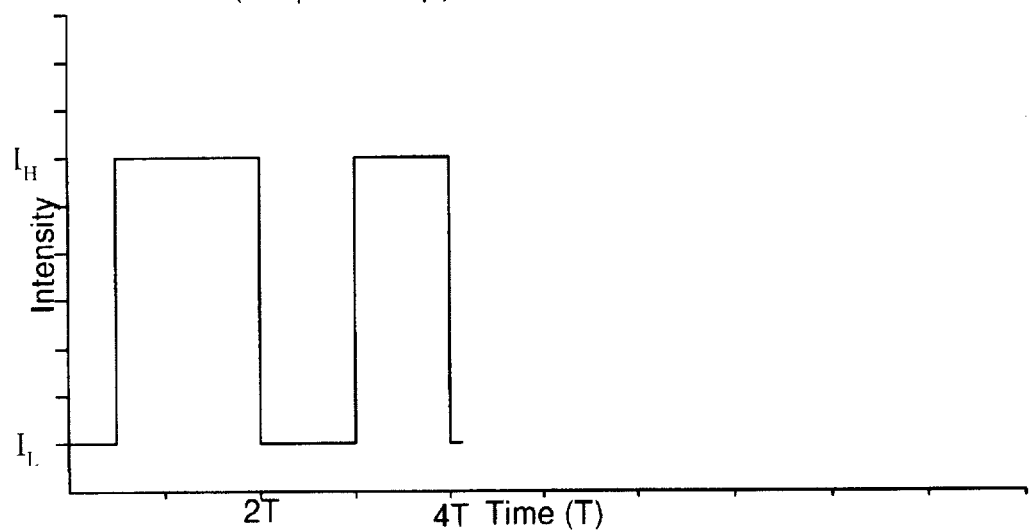
FIG. 4A is a graph of a 4T mark being written in accordance with the invention without precomp.
Figure 4B:
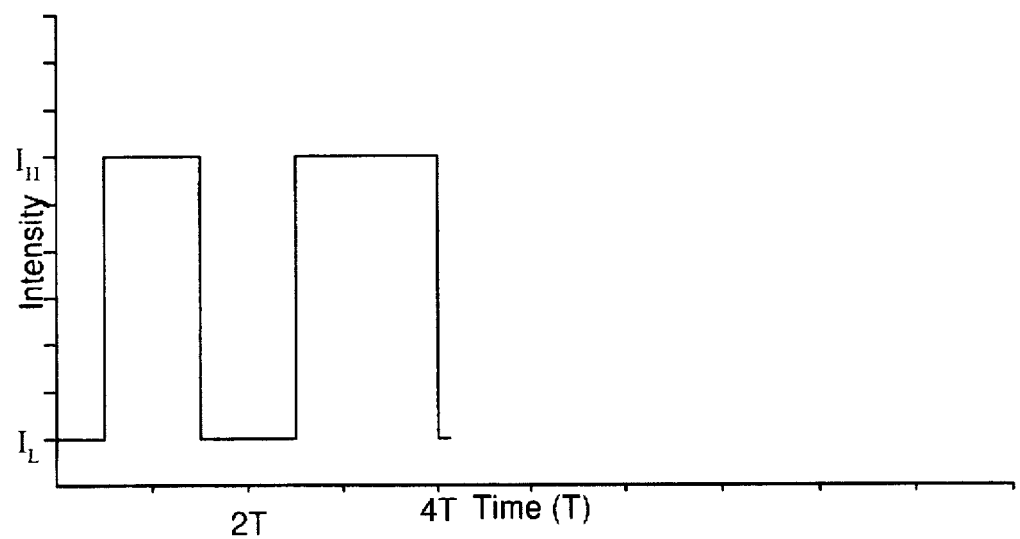
FIG. 4B is a graph of a 4T mark being written in accordance with the invention with precomp.

Consider that if the domain length of the second domain were 1T longer (i.e., a 3T space), then the primary MPP set would have been selected and the 4T mark would be written as shown in FIG. 4A.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

For example, the description has focused on writing marks and spaces. However, other and additional domain types are within the scope of the invention.

It is claimed:

1. A write method for an MO medium upon which user data is written as marks and spaces, the method comprising the steps of:

providing a first multipulse pattern (MPP) set and a second MPP set, each MPP set comprising a list of laser control codes, each laser control code for signaling a train of laser pulses to write a mark of a predetermined length, wherein at least one laser control code of the first MPP set for a given mark length is different from a laser control code of the second MPP set for the same given mark length, providing a first precomp threshold and a second precomp threshold;

receiving a stream of user bits at a first clock rate;

RLL encoding the stream of user data bits into a stream of modulation bits at the first clock rate, the modulation bits being either 0 or 1;

converting the stream of modulation bits into a stream of domain codes, each domain code comprising a domain type and a domain length, wherein in the stream of domain codes, the domain type alternates between "mark" and "space," wherein a 1 modulation bit signals the end of a first domain code and the start of a second domain code, and the domain length of a domain code comprises the number of 0 modulation bits between the 1 modulation bit which signaled the start of the domain code and the 1 modulation bit which signaled the end of the domain code;

issuing a laser control code to a laser driver for each domain code in the stream of domain codes, wherein:
        if the domain type of a given domain code is "space," then the laser control code comprises signals for
        writing a space having a length of the domain length of the domain code;
        else if the domain type of the given domain code is "mark:"
            if the last space had a domain length of less than or equal to the first precomp threshold, and the last mark had a domain length of greater than or equal to the second precomp threshold, then issuing the laser control code from the second MPP set for a mark length equal to the domain length of the domain code,
            else issuing the laser control code from the first MPP set for a mark length equal to the domain length of the domain code.

2. A write method for an MO medium upon which user data is written as marks and spaces as set forth in claim 1 wherein the laser control codes in the first MPP set and the second MPP set each comprise a variable length binary code, wherein a 0 bit of the binary code is for signaling a laser beam pulse of intensity $I_L$ and a 1 bit of the binary code is for signaling a laser beam pulse of an intensity $I_H$ higher than $I_L$.

3. A write method for an MO medium upon which user data is written as marks and spaces as set forth in claim 2 wherein laser beam pulses Of $I_L$ do not deliver significant heat energy and laser beam pulses of $I_H$ deliver significant heat energy.

4. A write method for an MO medium upon which user data is written as marks and spaces as set forth in claim 2 wherein the first MPP set and the second MPP set have the same number of laser control codes, and for laser control codes of each MPP set corresponding to the same mark length, the length of the laser control code is the same.

5. A write method for an MO medium upon which user data is written as marks and spaces as set forth in claim 4 wherein for laser control codes of each MPP set corresponding to the same mark length, the laser control codes have equal numbers of 1s and 0s.

6. A write method for an MO medium upon which user data is written as marks and spaces as set forth in claim 2 wherein for laser control codes of each MPP corresponding to a mark length greater than a given mark length, the corresponding laser control code of each MPP set is different.

7. A write method for an MO medium upon which user data is written as marks and spaces as set forth in claim 2, wherein the laser driver pulses a laser source so that contiguous 1s of a laser control code result in a single, continuous laser beam pulse.

8. A write method for an MO medium upon which user data is written as marks and spaces as set forth in claim 1, wherein the method is performed while the recording medium is rotated at substantially constant angular velocity, wherein the time for writing marks and spaces is measured in units of T, and T varies from the inner track to the outer track.

9. A write method for an MO medium upon which user data is written as marks and spaces as set forth in claim 1, wherein all of the laser control codes of the first MPP set for marks of greater than a given length are each different from the laser control codes of the second MPP set for the same mark lengths.

10. An apparatus for storing user data as domains on an MO medium, the apparatus comprising:

an encoder circuit for encoding the user data into modulation data;

a multipulse pattern generator circuit coupled to the encoder circuit for producing a control code from the modulation data, the multipulse generator circuit comprising:

first and second multipulse pattern sets, each multipulse pattern set comprising a list of predetermined control codes, each control code being associated with a predetermined domain length;

a domain characterizer circuit for charactering the modulation data as a domain code, the domain code comprising a domain type and a domain length, a buffer coupled to the domain characterizer circuit for storing the domain code, a pattern selector circuit coupled to the buffer for selecting a control code from the multipulse pattern sets corresponding to the domain code, and a shift register coupled to the pattern selector circuit; and writing means comprising a laser driver circuit and a laser source wherein the laser driver circuit is coupled to the shift register of the multipulse generator circuit for receiving the control codes and for each control code causing the laser source to emit plural laser pulses to write a domain of the predetermined domain length, wherein the laser pulses are of equal intensity and variable length.

11. A write method for an MO medium upon which user data is written as domains of plural domain types, the method comprising the steps of:

providing a first multipulse pattern (MPP) set and a second MPP set, each MPP set comprising a plural laser control codes, each laser control code for signaling a train of laser pulses to write a domain of a predetermined length, wherein at least one laser control code of the first MPP set for a given domain length is different from a laser control code of the second MPP set for the same given domain length, providing a first MPP set selection condition;

receiving a stream of bits;

converting the stream of bits into a stream of domain codes, each domain code comprising a domain type and a domain length;

buffering the domain codes;

issuing a laser control code to a laser driver for each domain code in the stream of domain codes, wherein if the domain type of the given domain code is a predetermined type and the first MPP set selection condition is met, then issuing the laser control code from the second MPP set for a domain length equal to the domain length of the domain code, else issuing the laser control code from the first MPP set for a domain length equal to the domain length of the domain code.

12. A write method for an MO medium upon which user data is written as domains of plural domain types as set forth in claim 11 including the steps of providing a third MPP set and providing a second MPP set selection condition, and in the step of issuing a laser control code, if the second MPP set selection is met then issuing the laser control code from the third MPP set for a domain length equal to the domain length of the domain code.

13. A write method for an MO medium upon which user data is written as domains of plural domain types as set forth in claim 11 including the step of providing a second MPP set selection condition, and in the step of issuing a laser control code, if the second MPP set selection is met then issuing the laser control code from the second MPP set for a domain length equal to the domain length of the domain code.

14. A write method for an MO medium upon which user data is written as domains of plural domain types as set forth in claim 11, wherein the laser pulses have equal intensity.

15. A write method for an MO medium upon which user data is written as domains of plural domain types as set forth in claim 11, wherein the laser control codes comprise variable length binary numbers, the time for writing domains is measured in units of T/2, and the binary digits of a given laser control code correspond to whether there should be a laser beam pulse at each time T/2.

16. An MO writing apparatus for writing domains on an MO medium, the MO writing apparatus comprising:

a domain characterizer circuit for characterizing data bits as a domain code, the domain code comprising a domain type and a domain length;

a pattern selection circuit for selecting a laser control code from plural multipulse pattern sets in accordance with pattern selection criteria;

a shift register coupled to the pattern selection circuit for bitwise shifting laser control codes; and a laser driver circuit for receiving a laser control code associated with a domain of a predetermined length from the shift register and then causing a laser source to emit plural laser pulses to write the domain, wherein the laser pulses are of equal intensity and variable length.

17. An apparatus for storing user data as domains on an MO medium as set forth in claim 10 wherein one or the other multipulse pattern set is selected based upon the length of the domain last written.

18. A write method for an MO medium upon which user data is written, the method comprising the steps of:

encoding the user data into modulation data;

characterizing the modulation data as a series of domain codes, the domain codes each comprising a domain type and a domain length;

storing the domain codes;

for each stored domain code, selecting a control code from plural multipulse pattern sets, each multipulse pattern set comprising a list of predetermined control codes, each control code being associated with a predetermined domain length; and in accordance with the control code, causing a laser source to emit plural laser pulses to write a domain of the predetermined domain length, wherein the laser pulses are of equal intensity and variable length, and the number, length and sequence of laser pulses is specified in the control code.

19. A magneto-optical writing apparatus for writing a stream of user data bits as domains on a magneto-optical medium, the magneto-optical writing apparatus comprising:

a first multipulse pattern (MPP) set and a second MPP set, for signaling a train of laser pulses to write a domain of a predetermined length, wherein at least one laser control code of the first multipulse pattern set for a given domain length is different from a laser control code of the second multipulse pattern set for the same given domain length;

an encoder circuit for encoding the stream of user data bits into a stream of modulation bits at a first clock rate, the modulation bits being 0 or 1;

a domain characterizer circuit for converting the stream of modulation bits into a stream of domain codes, each domain code comprising a domain type and a domain length, wherein in the stream of domain codes, the domain type alternates between "mark" and "space," wherein a 1 modulation bit signals the end of a first domain code and the start of a second domain code, and the domain length of a domain code comprises the number of 0 modulation bits between the 1 modulation bit which signaled the start of the domain code and the 1 modulation bit which signaled the end of the domain code;

a pattern selector circuit for issuing a laser control code to a laser driver circuit for each domain code in the stream of domain codes; wherein:

if the domain type of a given domain code is "space," then the laser control code comprises signals for writing a space having a length of the domain length of the domain code;

else if the domain type of the given domain code is "mark:"

if the last space had a domain length of less than or equal to a first precomp threshold, and the last mark had a domain length of greater than or equal to a second precomp threshold, then the laser control code comprises the laser control code from the second MPP set for a mark length equal to the domain length of the domain code, else the laser control code comprises the laser control code from the first MPP set for a mark length equal to the domain length of the domain code; and a laser source driven by the laser driver circuit.

20. A magneto-optical writing apparatus for writing a stream of user data bits as domains on a magneto-optical medium as set forth in claim 19 wherein the laser control codes in the first MPP set and the second MPP set each comprise a variable length binary code, wherein a 0 bit of the binary code is for signaling a laser beam pulse of intensity $I_L$ and a 1 bit of the binary code is for signaling a laser beam pulse of an intensity $I_H$ higher than $I_L$.

21. A magneto-optical writing apparatus for writing a stream of user data bits as domains on a magneto-optical medium as set forth in claim 20 therein laser beam pulses of $I_L$ do not deliver significant heat energy and laser beam pulses of $I_H$ deliver significant heat energy.

22. A magneto-optical writing apparatus for writing a stream of user data bits as domains on a magneto-optical medium as set forth in claim 20 wherein the first MPP set and the second MPP set have the same number of laser control codes, and for laser control codes of each MPP set corresponding to the same mark length, the length of the laser control code is the same and the value of the laser control code is different.

23. A magneto-optical writing apparatus for writing a stream of user data bits as domains on a magneto-optical medium as set forth in claim 22 wherein for laser control codes of each MPP set corresponding to the same mark length, the laser control codes have equal numbers of 1s and 0s.

24. A magneto-optical writing apparatus for writing a stream of user data bits as domains on a magneto-optical medium as set forth in claim 20 wherein for laser control codes of each MPP corresponding to a mark length greater than a given mark length, the corresponding laser control code of each MPP set is different.

25. A magneto-optical writing apparatus for writing a stream of user data bits as domains on a magneto-optical medium as set forth in claim 20 wherein the laser driver circuit pulses the laser source so that contiguous 1s of a laser control code result in a singles continuous laser beam pulse.

26. A magneto-optical writing apparatus for writing a stream of user data bits as domains on a magneto-optical medium as set forth in claim 19 further comprising a rotation means for rotating the magneto-optical medium at substantially constant angular velocity, wherein the time for writing marks and spaces is measured in units of T, the magneto-optical recording medium has a series of tracks from an inner track of the magneto-optical medium to an outer track of the magneto-optical medium, and T varies from the inner track to the outer track.

27. A magneto-optical writing apparatus for writing a stream of user data bits as domains on a magneto-optical medium as set forth in claim 19 wherein all of the laser control codes of the first MPP set for marks of greater than a given length are each different from the laser control codes of the second MPP set for the same mark lengths.

28. A magneto-optical writing apparatus for writing a stream of user data bits as domains on a magneto-optical medium of plural domain types, the magneto-optical writing apparatus comprising:

a first multipulse pattern (MPP) set and a second MPP set, each MPP set comprising plural laser control codes, each laser control code for signaling a train of laser pulses to write a domain of a predetermined length, wherein at least one laser control code of the first MPP set for a given domain length is different from a laser control code of the second MPP set for the same given domain length, a domain characterizer circuit for converting a stream of bits into a stream of domain codes, each domain code comprising a domain type and a domain length;

a buffer coupled to the domain characterizer for buffering the domain codes;

a pattern selector circuit for selecting a laser control code for each domain code in the stream of domain codes, wherein if the domain type of the given domain code is a predetermined type and a first MPP set selection condition is met, then selecting the laser control code from the second MPP set for a domain length equal to the domain length of the domain code, else selecting the laser control code from the first MPP set for a domain length equal to the domain length of the domain code.

29. A magneto-optical writing apparatus for writing a stream of user data bits as domains on a magneto-optical medium as set forth in claim 28, the pattern selector circuit further for detecting if a second MPP set selection condition is met and selecting the laser control code from the first MPP set for a domain length equal to the domain length of the domain code.

30. A magneto-optical writing apparatus for writing a stream of user data bits as domains on a magneto-optical medium as set forth in claim 28 wherein the pattern selector circuit is further for detecting if a second MPP set selection condition is met and selecting the laser control code from the second MPP set for a domain length equal to the domain length of the domain code.

31. A magneto-optical writing apparatus for writing a stream of user data bits as domains on a magneto-optical medium as set forth in claim 28 wherein the laser control codes are for signaling laser pulses of equal intensity.

32. A magneto-optical writing apparatus for writing a stream of user data bits as domains on a magneto-optical medium as set forth in claim 28 wherein the laser control codes comprise variable length binary numbers, the time for writing domains is measured in units of T/2, and the binary digits of a given laser control code correspond to whether there should be a laser beam pulse at each time T/2.

* * * * *